(12) United States Patent
Mozdy et al.

(10) Patent No.: US 6,865,303 B2
(45) Date of Patent: Mar. 8, 2005

(54) METHOD AND APPARATUS FOR REDUCING MULTI-PATH INTERFERENCE IN DISPERSION COMPENSATION SYSTEMS

(75) Inventors: Eric J. Mozdy, Elmira, NY (US); William A. Wood, Painted Post, NY (US)

(73) Assignee: Avanex Corporation, Fremont, CA (US)

(*) Notice: Subject to any disclaimer, the term of this patent is extended or adjusted under 35 U.S.C. 154(b) by 110 days.

(21) Appl. No.: 10/178,800

(22) Filed: Jun. 24, 2002

(65) Prior Publication Data

US 2003/0235360 A1 Dec. 25, 2003

(51) Int. Cl.[7] .............................................. G02F 1/035
(52) U.S. Cl. ........................................................ 385/3
(58) Field of Search .............................................. 385/3

(56) References Cited

U.S. PATENT DOCUMENTS

| | | | | |
|---|---|---|---|---|
| 6,310,716 B1 | * | 10/2001 | Evans et al. ................. | 359/334 |
| 6,504,973 B1 | * | 1/2003 | DiGiovanni et al. .......... | 385/27 |
| 6,657,774 B1 | * | 12/2003 | Evans et al. ................. | 359/334 |
| 2002/0164140 A1 | * | 11/2002 | Lysiansky et al. .......... | 385/127 |
| 2003/0169482 A1 | * | 9/2003 | Kung et al. .............. | 359/341.1 |
| 2003/0210876 A1 | * | 11/2003 | Gaarde et al. .............. | 385/123 |

* cited by examiner

*Primary Examiner*—Mark Tremblay
(74) *Attorney, Agent, or Firm*—Moser, Patterson & Sheridan, L.L.P.

(57) ABSTRACT

An optical apparatus comprises a dispersion compensating optical waveguide, and an optical pump that pumps the dispersion compensating optical waveguide with light. The light from the pump provides suitable selective gain to a fundamental mode of the dispersion compensating optical waveguide that multi-path interference is substantially reduced.

A method of reducing multi-path interference comprises pumping a dispersion compensating optical waveguide with light to provide suitable selective gain to a fundamental mode of the dispersion compensating optical waveguide so that MPI from said dispersion compensating optical waveguide is significantly reduced.

19 Claims, 1 Drawing Sheet

METHOD AND APPARATUS FOR REDUCING MULTI-PATH INTERFERENCE IN DISPERSION COMPENSATION SYSTEMS

FIELD OF THE INVENTION

The present invention relates generally to optical communications, and specifically to a method and apparatus for reducing multi-path interference (MPI) in optical links.

BACKGROUND

Optical transmission systems, including optical fiber communication systems, have become an attractive alternative for carrying voice and data at high speeds. In optical transmission systems, waveform degradation due to chromatic dispersion in the optical transmission medium can be problematic, particularly as transmission speeds continue to increase.

Chromatic dispersion results from the fact that in transmission media such as glass optical waveguides, the higher the frequency of the optical signal, the greater the refractive index. The refractive index in a bulk material at a particular frequency is defined to be the ratio of the vacuum wavelength of the signal at that frequency to the wavelength of the signal in the material. Equivalently, it is defined to be the ratio of the phase velocity of the signal in the material to the speed of light in vacuum.

In single mode optical fiber, chromatic dispersion can result from the interplay of two underlying effects, material dispersion and waveguide dispersion. Material dispersion results from the non-linear dependence upon wavelength of the refractive index, and the corresponding group velocity of the material, illustratively doped silica. Waveguide dispersion results from the wavelength-dependent relationship of the index of refraction between the core and the cladding and the fraction of the optical intensity contained in each.

Moreover, impurities in the waveguide material, mechanical stress and strain, and temperature effects can also affect the index of refraction, further adding to the ill effects of chromatic dispersion.

In digital optical communications, where the optical signal is ideally a square wave, bit spreading due to chromatic dispersion can be particularly problematic. Because of the spectral dependence of the propagation velocity due to chromatic dispersion, the shape of the waveform can be substantially distorted. The effects of this type of dispersion are a spreading of the original pulse in time, causing it to overflow in the time slot that has already been allotted to another bit. When the overflow becomes excessive, intersymbol interference (ISI) may result. ISI may result in an increase in the bit-error rate to unacceptable levels.

As can be appreciated, compensating for chromatic dispersion is increasingly important in optical communications. One known method for compensating for chromatic dispersion is through the use of specialty fiber known as dispersion compensating fiber (DCF).

Dispersion compensating fibers often have added dopants (e.g., Ge) in the core. While beneficial to the desired end of providing suitable dispersion compensation, adding dopants to the core also increases the effective index of refraction of the core. As a consequence, the fiber can support multiple modes (and thus may be referred to as a 'few-moded' fiber). These additional modes can result in multi-path interference (MPI), a well-known system impairment.

MPI results from the existence of a plurality of paths for signal light in an optical network. If light is launched from a single laser source into a fiber, and subsequently divides among these plurality of paths, the light in each separate path will accumulate a certain amount of relative phase delay. If the light from these paths recombines in total or in part, coherently or incoherently, interference can result. This begets intensity variations, and ultimately results in system impairment.

One significant source of MPI is the propagation of multiple transverse modes in the system. Since each mode has a different effective index of refraction, light will experience different path lengths in each mode, resulting in MPI. This is one reason for the desire for single-mode waveguide systems. However, as described above, the need for increasingly accurate dispersion compensation often necessitates the design of waveguides that unfortunately allow the propagation of multiple modes.

From the above description, it is clear that there are certain competing interests in optical communications systems. These include a need to compensate for chromatic dispersion; and a need is to reduce, if not eliminate, MPI.

SUMMARY

In accordance with an exemplary embodiment of the present invention, an optical apparatus comprises a dispersion compensating optical waveguide, and an optical pump that pumps the dispersion compensating optical waveguide with light.

In accordance with another exemplary embodiment of the present invention, a method of reducing multi-path interference comprises pumping a dispersion compensating optical waveguide with light to provide suitable selective gain to a fundamental mode of the dispersion compensating optical waveguide so that MPI from said dispersion compensating optical waveguide is significantly reduced.

BRIEF DESCRIPTION OF THE DRAWING

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, in accordance with exemplary embodiments of the present invention described in detail herein, an optical apparatus and method reduces MPI in dispersion compensating (DC) optical waveguides used in a variety of optical links by pumping the DC waveguides with light. Usefully, this enables DC waveguides to be designed to provide a greater degree of dispersion compensation, or dispersion slope compensation, or both to be achieved, while suppressing higher order modes relative to the fundamental optical mode. This results in a reduction in the MPI in the optical link in which the apparatus and method are used.

Figure 1:
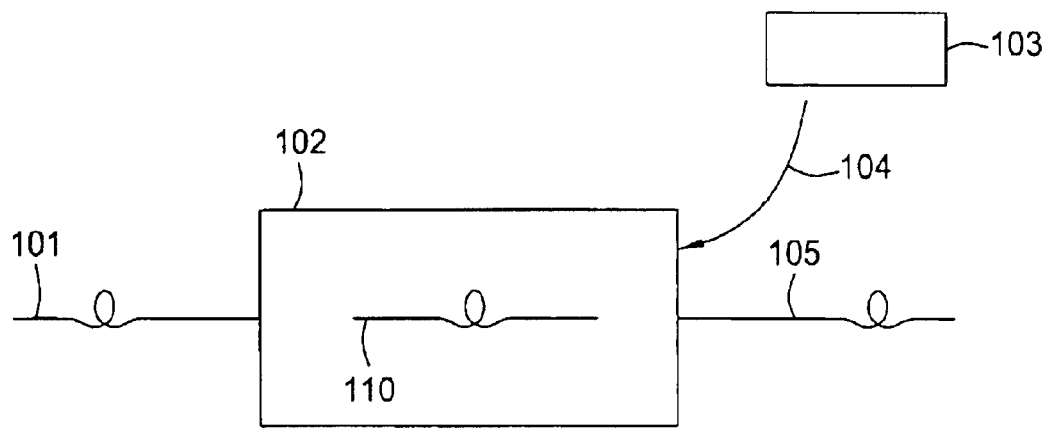
FIG. 1 is a schematic representation of an optical apparatus in accordance with an exemplary embodiment of the present invention.

FIG. 1 shows a schematic diagram of an optical apparatus 100 in accordance with an exemplary embodiment of the present invention. The optical apparatus 100 receives an input optical signal that traverses an input waveguide 101, which is illustratively an optical fiber. The input optical signal is input to a dispersion compensating module (DC module) 102, which has a DC optical waveguide 110 disposed therein. As described in further detail below, the DC optical waveguide is illustratively a DCF that has a germanium-doped core, which fosters an improved bend sensitivity, but which may support higher-order modes (i.e., the DC waveguide may be few-moded). As described previously, these higher order modes may result in MPI in an optical link.

The DC waveguide of the DC module 102 is pumped by light 104 with an optical pump 103. Illustratively, the optical pump 103 is a Raman pump. As is well known, Raman pumping results in optical gain from optical phonons within the guiding material of the waveguide (in this example, the material of the DC waveguide). To this end, if the pump light 104 sufficiently excites the glass molecules to high-energy vibrational states, their relaxation results in photon emission. These emitted quanta of light can be used to increase the gain of the fundamental mode of the DC waveguide. For example, an emitted photon is approximately −12 THz less than the frequency of the pump signal. This translates to approximately 100 nm in a common 1550 nm optical communications link. As a result, without providing additional dopants to the core of the DC waveguide, an optical pump near 1450 nm can provide gain to an optical signal having wavelength of 1550 nm.

In the exemplary embodiments described herein, and as will become more clear as the present invention proceeds, when the DC waveguide is Raman pumped by light 104 from the Raman pump 103, most of gain is realized by the fundamental mode because the higher order modes do not overlap significantly spatially with the single-mode transverse profile of the Raman pump 103.

The use of Raman optical pump 103 in combination with the DC module 102 not only can improve the overall gain of the fundamental mode, but can also decrease MPI in the system while enabling improved DC and dispersion slope compensation. Advantageously, therefore, an exemplary embodiment of the present invention provides DC and dispersion slope compensation, while reducing MPI.

For purposes of illustration, and not limitation, the following quantitative description of the pumping of a few-moded DCF is given.

In a 3 km length of DCF, Raman pumping may be effected to realize a gain of approximately 12 dB. The maximum MPI in such a system can be shown to be:

$$\text{Max MPI(dB)} \propto 10 \log I_1/I_2 \quad (1)$$

Where $I_1$ is the intensity of the fundamental mode and $I_2$ is the intensity of a higher-order mode. In the present exemplary embodiment of the present invention, the fundamental mode would experience 12 dB of gain, while the higher-order mode(s) would experience substantially no gain from the pumping. This follows, of course, from the fact that the mode field of the Raman pump is most similar to the fundamental mode of the DC fiber, while higher order modes of the DC fiber, which can cause MPI, have much less spatial overlap with the Raman pump field. This approximation does not take into account the different mode field of the pump and signal, which could actually provide some gain to the higher-order mode(s).

From the above, it can be shown that 12 dB of Raman gain can result in a reduction of approximately 12 dB of MPI. It is noted that in the less common case of coherent MPI, the reduction in MPI may be only 6 dB. In either case the reduction of MPI enables greater CD and dispersion slope compensation with MPI that is below specified levels. Clearly, this is beneficial in optical links, particularly as bandwidths are increased.

It is noted that in the above exemplary embodiments the use of a Raman pump is merely illustrative. However, it is noted that in accordance with other exemplary embodiments of the present invention other amplification methods may be used to realize gain in the fundamental mode of the DC waveguide, while substantially not amplifying the higher-order modes. An alternative amplification technique includes, but is not limited to, erbium-doped DC fiber where $Er^{+3}$ ions or other rare earth ions in the fiber core produce gain selectively for the fundamental mode, and the fiber profile is designed in order to accomplish proper dispersion compensation, or dispersion slope compensation, or both, while reducing MPI. It is further noted that in the exemplary embodiment shown in FIG. 1, the Raman pump 103 is counter-propagating. This too is merely illustrative of the present embodiment, and co-propagating pump light or a combination of counter- and co-propagating light may be used. It is further noted that more than one pump may be used in carrying out the exemplary embodiments of the present invention.

Figure 2:
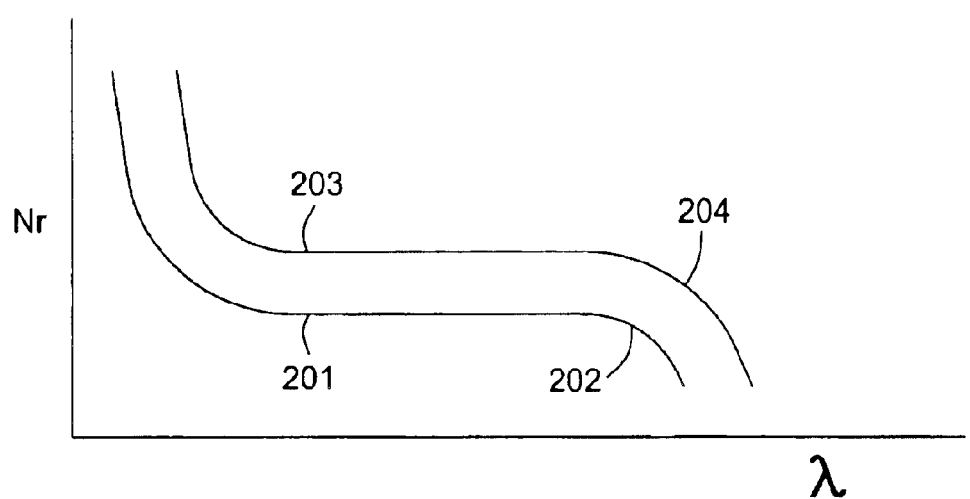
FIG. 2 is a graphical representation of the relative index of refraction ($n_r$) versus wavelength in a dispersion compensating fiber in accordance with an exemplary embodiment of the present invention.

A better understanding of the problems that the exemplary embodiments of the present invention overcome, and of the benefits of the exemplary embodiments may be obtained through a discussion of FIG. 2, read in light of the optical apparatus and it method of use in FIG. 1.

FIG. 2 is a graph of the relative index of refraction ($n_r$) between the core of a dispersion compensating optical fiber and its cladding layer (or between the guiding layer of a DC waveguide and the dielectric layer thereabout) versus wavelength λ. A lower curve 201 is for a standard DCF, while an upper curve is of a DCF having a greater concentration of dopants (e.g., Ge) to increase the index differential across the operational spectrum.

As is commonplace, the wavelengths at which many optical systems operate are generally at the 'knee' of the curves; or in the first region 202 in the lower curve 201, and at the second region 204 of the upper curve 203. As mentioned previously, the lower curve 201 may be useful in avoiding the capability of supporting higher-order optical modes in the DCF. Moreover, any higher order optical modes in a fiber having an index characteristic such as that of lower curve 201 would likely be weakly supported; and may be stripped out to a great extent via bends in the deployed DCF. This would leave the fundamental mode supported in the DCF, and therefore the optical link.

However, providing DCF's having an index characteristic over wavelength such as that of lower curve 204 also places constraints on the fiber designer's ability to provide increased chromatic dispersion and dispersion slope compensation capability. To wit, it may be useful to have an increased index differential between the core and cladding layers. Alternatively, or additionally, the core or guiding layer size may be increased (compared to known DCF) to improve the dispersion compensation capabilities, or dispersion slope capabilities, or both, of the DCF (or other DC waveguide). These changes, alone or in combination, will improve the CD and slope compensation capabilities of the dispersion compensating fiber (or waveguide).

As previously described, operation along an index differential such as upper curve 203 enables the higher order modes to be supported. In this case, bends and other known techniques are not as effective at stripping these higher-order modes, and the incidence of MPI and other problems associated with higher-order modes in the optical system can be deleterious to optical performance. As such, in DC fibers and waveguides that turn out to be 'few-moded' in the quest to improve the dispersion and dispersion slope compensating capabilities of MPI can be unacceptable.

However, by virtue of the exemplary embodiments of the present invention, DC fibers and waveguides have the requisite characteristics (e.g., core or guiding layer doping concentrations) to provide desired levels of chromatic dispersion (CD) and dispersion slope compensation, without increasing (if not decreasing) MPI.

For purposes of illustration, and not limitation, the following description depicts a typical DCF and resultant MPI, DC and dispersion slope compensation readily attained using an exemplary embodiment of the present invention. In the presently described exemplary embodiment, the DCF is illustratively a LEAF® compensation fiber that is commercially available. This DCF would be part of a DC module such as DC module 102 of the exemplary embodiment of the present invention. The DCF is capable of providing dispersion compensation in the range of approximately −350 ps/nm-km to approximately −70 ps/nm-km; and can provide dispersion slope compensation in the range of approximately −7 ps/nm$^2$-km to approximately −1 ps/nm$^2$-km.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

What is claimed is:

1. An optical apparatus, comprising:
    a dispersion compensating module having a dispersion compensation optical waveguide having a fundamental mode and a higher-order mode; and
    an optical pump which provides light to said dispersion compensating optical waveguide,
    wherein said dispersion compensation optical waveguide is configured such that the light provided by said optical pump amplifies said fundamental mode substantially more than said higher-order mode so as to reduce multi-path interference (MPI) in an optical link.
2. An optical apparatus as recited in claim 1, wherein said optical pump is a Raman pump.
3. An optical apparatus as recited in claim 1, wherein said dispersion compensating waveguide is a DCF.
4. An optical apparatus as recited in claim 1, wherein said dispersion compensating waveguide compensates for chromatic dispersion and dispersion slope.
5. An optical apparatus as recited in claim 4, wherein said chromatic dispersion compensation is in the range of approximately −350 ps/nm-km to approximately −70 ps/nm-km.
6. An optical apparatus as recited in claim 4, wherein said dispersion slope compensation is in the range of approximately −7 ps/nm$^2$-km to approximately −1 ps/nm$^2$-km.
7. An optical apparatus as recited in claim 1, wherein said optical apparatus further comprises at least one other optical pump coupled to said dispersion compensating optical waveguide.
8. An optical apparatus as recited in claim 1, wherein MPI is reduced by an amount in the range of approximately 6 dB to approximately 12 dB.
9. An optical apparatus as recited in claim 1, wherein said dispersion compensating optical waveguide has a core that is doped with rare-earth metal dopants.
10. An optical apparatus as recited in claim 1, wherein said rare-earth metal dopants are $Er^{+3}$.
11. An optical apparatus as recited in claim 1, wherein said light from said optical pump is chosen from the group consisting essentially of: co-directional propagating light and counter-directional propagating light.
12. A method of reducing multi-path interference (MPI) in an optical link, the method comprising:
    providing a dispersion compensating module having a dispersion compensating optical waveguide having a fundamental mode and a higher-order mode; and
    pumping said said dispersion compensating optical waveguide with light to amplify said fundamental mode substantially more than said higher-order mode so as to reduce MPI.
13. A method as recited in claim 12, wherein said pumping further comprises Raman pumping.
14. A method as recited in claim 12, wherein said dispersion compensating optical waveguide compensates for chromatic dispersion and dispersion slope.
15. A method as recited in claim 14, wherein said chromatic dispersion compensation is in the range of approximately −350 ps/nm-km to approximately −70 ps/nm-km.
16. A claim method as recited in claim 14, wherein said dispersion slope compensation is in the range of approximately −7 ps/nm$^2$-km to approximately −1 ps/nm$^2$-km.
17. A method as recited in claim 12, wherein MPI is reduced by an amount in the range of approximately 6 dB to approximately 12 dB.
18. A method as recited in claim 12, wherein said dispersion compensating optical waveguide is a DCF.
19. A method as recited in claim 12, wherein said dispersion compensating optical waveguide is a DCF.

* * * * *